United States Patent [19]

Tran et al.

[11] Patent Number: 5,460,980
[45] Date of Patent: Oct. 24, 1995

[54] PROCESS FOR FORMING A PHOSPHOR

[75] Inventors: Nang T. Tran, Lake Elmo; Kenneth R. Paulson, Oakdale; Bruce A. Sventek, St. Paul, all of Minn.

[73] Assignee: Minnesota Mining and Manufacturing Company, Saint Paul, Minn.

[21] Appl. No.: 323,801

[22] Filed: Oct. 17, 1994

Related U.S. Application Data

[63] Continuation of Ser. No. 127,748, Sep. 27, 1993, abandoned.

[51] Int. Cl.⁶ .............................. H01L 31/18; B05D 5/12
[52] U.S. Cl. ..................... 437/2; 437/4; 427/68; 427/70; 427/126.2; 427/257; 427/267; 427/294; 427/376.1
[58] Field of Search .............. 427/68, 70, 126.2, 427/257, 267, 294, 376.1; 437/2, 4

[56] References Cited

U.S. PATENT DOCUMENTS

| | | | |
|---|---|---|---|
| 3,783,297 | 1/1974 | Houston | 250/483 |
| 3,783,298 | 1/1974 | Houston | 250/483 |
| 3,783,299 | 1/1974 | Houston | 250/483 |
| 3,825,763 | 7/1974 | Ligtenberg et al. | 250/486 |
| 4,011,454 | 3/1977 | Lubowski et al. | 250/483 |
| 4,069,355 | 1/1978 | Lubowski et al. | 427/70 |
| 4,209,705 | 6/1980 | Washida et al. | 250/486 |
| 4,236,077 | 11/1980 | Sonoda et al. | 250/361 R |
| 4,437,011 | 3/1984 | Noji et al. | 250/486.1 |
| 5,153,438 | 10/1992 | Kingsley et al. | 250/370.09 |
| 5,171,996 | 12/1992 | Perez-Mendez | 250/361 R |
| 5,302,423 | 4/1994 | Tran et al. | 427/555 |
| 5,368,882 | 11/1994 | Tran et al. | 427/65 |

FOREIGN PATENT DOCUMENTS

| | | | |
|---|---|---|---|
| 0175578 | 3/1986 | European Pat. Off. | G21K 4/00 |
| 22218 A/89 | 10/1989 | Italy . | |
| WO93/03496 | 7/1992 | WIPO | H01L 21/306 |

OTHER PUBLICATIONS

"Enhanced Structure in CsI Layer by Substrate Patterning", Jing et al., IEEE Trans. Nucl. Sci., vol. 39, No. 5 (Oct. 1992).

Primary Examiner—Benjamin L. Utech
Attorney, Agent, or Firm—Gary L. Griswold; Walter N. Kirn; Gregory A. Evearitt

[57] ABSTRACT

The growth of a phosphor layer deposited on a patterned substrate containing a multiplicity of recessed ridges of triangular cross section can be controlled by tailoring the geometry of the recessed ridge structures. During the deposition process, little or no phosphor deposition occurs on the recessed ridge structures, and cracks are formed which separate the otherwise uniformly growing phosphor which is present in other regions of the patterned substrate where more substantial phosphor deposition occurs.

24 Claims, 1 Drawing Sheet

PROCESS FOR FORMING A PHOSPHOR

This is a continuation of application Ser. No. 08/127,748 filed Sep. 27, 1993, now abandoned.

FIELD OF THE INVENTION

This invention relates to a process for forming a phosphor and in particular, it relates to a process for forming a phosphor on a substrate having a predetermined configuration.

BACKGROUND OF THE ART

One of the essential components of a radiation imaging device is a radiation input converter. In most applications of position-sensitive radiation detection, conventional radiography, and digital radiography, a phosphor screen is used to convert the incoming radiation into visible light which is then detected on film, on a photodiode, or other position sensing device. Such phosphor screens are usually required to have high resolution and high output brightness characteristics. The brightness of the light output is, in part, a function of the thickness of the phosphor layer, which determines the amount or X-ray energy absorbed, and of the inherent phosphor efficiency in converting X-ray radiation into detectable light. However, as this layer is made thicker, the spatial resolution is decreased because light photons emitted in response to the absorption of X-ray photons or charged particles will scatter within the phosphor layer and emerge from the phosphor surface at points further away in the transverse direction. Such lateral light spreading is caused by two factors. First, the phosphor emits light photons isotropically from the point at which a radiation particle, such as the X-ray photon, is absorbed. Second, even light photons which are traveling more or less perpendicularly to the surface of the phosphor layer may be scattered in the lateral direction before they reach the surface. Thus, the actual thickness of the phosphor layer is a compromise between the desired high radiation absorption that may be obtained from thicker layers and the required or desired resolution which improves as the thickness of the layer is reduced. Clearly, it would be desirable to increase the thickness of the phosphor layer without degrading the spatial resolution. This can be accomplished by suppressing the lateral light spread within the layer through the formation of small cracks perpendicular to the phosphor surface.

The incorporation of cracks in the phosphor layer, which are essentially perpendicular to the surface of the phosphor layer, provides enhancement of the resolution of light emitted from the phosphor in response to incident X-rays. A phosphor "cell" is formed when a continuous coating of phosphor is surrounded by a boundary of cracks. An emitted photon from the interaction of the phosphor with an X-ray will be effectively contained within a phosphor cell due to the presence of a crack or gap in the phosphor. If the angle of incidence of the photon is sufficiently large, the photon will be reflected back into the phosphor cell by total internal reflection, thereby isolating the photons generated in one cell from an adjacent cell. Alternatively, if the space between adjacent cells is filled with either an opaque or reflective material, the photons generated within the cell will be absolutely contained within the cell.

One early approach to forming a light-guiding structure in a luminescent layer was to deposit a thin scintillation layer of CsI on the substrate and impart thermal shocks to the CsI layer, producing cracks therein due to the different thermal expansion coefficients of the substrate and the CsI layer. Another light-guide structure fabrication method was made in which the substrate had a very thin $Al_2O_3$ layer which formed a mosaic of cracks due to thermal shocks, the cracks forming small grooves on the substrate. This type of cracked or net-like mosaic substrate further enhances the columnar structure of the phosphor material deposited on it. However, a phosphor layer prepared by these processes has the following drawbacks: 1) the columns defined by cracks have an irregular structure, which decreases the light collimation and thus, decreases the resolution; and 2) it is difficult to ensure the reproducibility of the size or position of the randomly formed columns. For these reasons, CsI X-ray radiation layers (150–200 μm thick) made by these methods have spatial resolution of only 4 to 6 line-pair/mm at the 10 percent level. It is desirable to generate a spacial resolution of at least 10 lp/mm for use in diagnostic radiography.

U.S. Pat. No. 4,209,705 teaches the columnar growth of CsI phosphor over a metal pattern which is deposited in the grooves between a random mosaic pattern formed on a substrate. The metal protrusions are used to intensify the image sharpness by restricting lateral illumination (spreading within the phosphor layer) via reflection off the metal pattern. Most of the collimating of the light occurs due to the total internal reflection within the columns of formed phosphor. The random mosaic pattern is an insulating layer formed on an aluminum substrate in one embodiment. In another embodiment, the mosaic forming layer is from a different plated material such as molybdenum oxide which is treated to form random cracks in the material. See also U.S. Pat. No. 4,236,077 for a similar approach.

"Enhanced Columnar Structure in CsI Layer by Substrate Patterning", Jing et al., *IEEE Trans. Nucl. Sci.*, Vol. 39, No. 5 (Oct. 1992) discloses the use of photolithography to form a mesh-patterned substrate onto which a CsI phosphor layer is deposited. The columnar growth of the thallium doped CsI on the mesh pattern causes the initiation of a crack formed on the ridges of the mesh pattern, and the deformation stress controls further growth to propagate the crack. In this teaching, the benefit of initiating the growth over a ridge serves to enhance the parallel columnar growth of the phosphor, as it is shown that without the presence of ridges, the phosphor grows with discontinuous random cracks oriented at a multiplicity of angles relative to the substrate. The width of the cracks formed are on the same order as the width of a discontinuity between adjacent columns in the structure. If the CsI layer is allowed to grow far enough, the cracks vanish at the top of the layer at about 450 microns in height.

U.S. Pat. No. 4,437,011 teaches the use of phosphor seed particles which are vapor deposited onto a substrate, which serve as nucleation sites for the subsequent deposition of additional phosphor which will grow as a series of columns vertically from the seed, with a crack or discontinuity between adjacent columns corresponding to the placement of neighboring seed particles. To permit a continuous layer to be formed on the surface of the crack separated columns, another phosphor layer is deposited over the columns in such a manner so as to form a continuous film for subsequent deposition of a transparent conductive layer for conversion of the light to photoelectrons.

E.P. Application No. 0,175,578 teaches the use of a phosphor which does not contain a binder to improve the response to irradiation. Mention is made of the advantage of having the phosphor align itself into discrete blocks, either formed on a PET sheet, or formed by treating an oxide surface.

U.S. Pat. No. 4,011,454 discloses a phosphor screen for converting X-rays to light which includes a large number of discrete columns of the phosphor material, such as doped CsI, with the spaces therebetween preferably filled with a reflective substance which itself may be a phosphor (e.g., $Gd_2O_2S$ or $La_2O_2S$). Because of the resulting inhibition of lateral spread of light within the phosphor screen, it may be made thicker than conventional screens while achieving at least as high a resolution and contrast, thereby increasing brightness (and thus requiting lower X-ray "doses"). The patent also discloses a method for making the screen which includes using a patterned substrate and wide-angle vapor deposition (as in a hot-wall evaporator) so as to deposit the phosphor only on the raised portions of the substrate.

In the method of '454, a pattern is formed on the substrate to be used for deposition of the phosphor. The pattern used generally has a "checkerboard" pattern of straight-walled, square-based mesas separated by slots or grooves typically 100 microns in width. This substrate is then placed in a specially designed vacuum evaporation apparatus that is equipped with heated walls and a heated plate which serves as a shield placed between the evaporation boat and the substrate. When the walls and shield of the system are heated sufficiently, any phosphor particles in the vapor phase will reflect from, rather than stick to, these heated surfaces. In this manner, the phosphor, which is rapidly evaporated from the boat, will preferentially approach the deposition surface from a (somewhat controllable) large angle of incidence. As phosphor particles intercept the cooler surface of the substrate, deposition occurs preferentially on the raised portions of the mesas since the large angle of incidence shields the bottoms of the grooves from deposition. In this way, the mesas grow in height, remaining separated by a gap. As the deposition continues, the tops of the mesas begin to increase in lateral dimensions, thereby beginning to close off the intervening gaps between them, and the deposition must be halted to permit a high temperature annealing step. Annealing of the phosphor serves to densify the structure, essentially regenerating the entire gap width at which point the deposition steps can be repeated until the final thickness of the phosphor is obtained. In this process, the phosphor is deposited at a rapid deposition rate of about 50 microns per minute, and the annealing step takes place at an elevated temperature of about 450° C.

U.S. Pat. No. 5,171,996 and PCT Publn. No. WO 93/03496 disclose a method and apparatus for producing separated columns of scintillation material offering improved spatial resolution. In this method, a pattern of vertical walled ridges is formed on a substrate and the subsequent deposition of a phosphor over this surface is claimed to form discrete columns of phosphor separated by spaces which can be filled with a material which absorbs light. In this method, the deposition of a wide range of scintillation materials is claimed to form columns where the separation gap between columns is maintained until the columns reach a height not more than 50 times the lateral width of the vertical walled ridges.

U.S. Pat. No. 5,153,438 discloses an electronic X-ray imaging array made by combining a two-dimensional photosensitive array with a structured scintillator array, having a common array pattern and suitable alignment marks thereon, by coding them face-to-face in alignment for direct coupling of X-ray luminescence from the scintillator array to the photosensitive array.

In view of the foregoing art, it is apparent that what is needed in the industry is a technique whereby a phosphor screen used for converting X-rays can be easily fabricated so that phosphor cells are associated with a single sensor and are isolated from adjacent sensor elements. In particular, it would be desirable to form this phosphor screen in a manner which prevents the substrate onto which it is attached from being subjected to any extreme conditions such as high temperatures which could potentially damage the substrate, since this substrate may be a semiconductor device used for the conversion of photons emitted from the phosphor to an electrical signal.

SUMMARY OF THE INVENTION

In accordance with the present invention, it has now been discovered that the growth of a phosphor layer deposited on a patterned substrate consisting of a multiplicity of ridges of triangular cross section is, in part, controlled by the geometry of the ridge structures. In particular, it has been discovered that the deposition of phosphor onto a substrate posessing ridge structures which have a triangular cross-sectional shape, the ridges extending either outward from or inward to the major surface of the substrate, is affected due to the presence of the ridges. During the deposition process, little or no phosphor deposition occurs on the ridge structures, and cracks are formed which separate the otherwise uniformly growing phosphor which is present in other regions of the patterned substrate where more substantial phosphor deposition occurs. The cracks start forming at the side of the base of the ridge, then propagate upward as the deposition continues in such a manner that when the deposition of the phosphor is completed, the crack extends from the top surface of the phosphor layer to the base of the substrate, and the crack is positioned over the ridge structure on the substrate.

Thus, there is provided a process for forming a phosphor comprising the steps of:

(a) providing a substrate for deposition and growth of an alkali halide phosphor;

(b) forming a patterned surface on the substrate comprising a plurality of ridges, each ridge having an angular inclined slope, and an angular declined slope, the inclined and declined slope meeting at one common region to form a structure having a triangular cross-sectional shape, each ridge being separated from one another by horizontal segments of the substrate and wherein:

(i) the ratio of the height of each ridge to the width of each horizontal segment of the substrate separating the ridges is in the range of about 1:100 to 1:5;

(ii) the ratio of the width of each ridge to the width of each horizontal segment of the substrate separating the ridges is in the range of about 1:50 to 1:5; and (c) depositing an alkali halide phosphor on the patterned surface of the substrate of step (b), thereby forming cracks, in the deposited phosphor, which originate or emanate from the angular inclined and/or declined slopes of each ridge.

Optionally, the cracked phosphor structure resulting from step (c) is annealed in an inert atmosphere at a temperature of from about 150° to 300° C. for about 1 to 3 hours.

Generally, the crack formation effect can be further enhanced by using a substrate whose coefficient of thermal expansion is considerably different from the coefficient of thermal expansion of the deposited phosphor, which can, for example, be CsI which has a coefficient of thermal expansion equal to $5 \times 10^{-5}/°C$. Optionally, a thin substrate from about 100 to about 400 microns is used to enhance the stress developed between the phosphor and the substrate, therefore enhancing the crack formation. The thin substrate can be mounted or laminated on a supporting body such as a silicon wafer, glass, or plastic substrate.

In one preferred embodiment, the substrate is connected to an array of sensors.

In a second preferred embodiment, the substrate is connected to a silver halide-based, conventional photographic film used for producing a readable image.

In a third preferred embodiment, the substrate contains a pattern of electrical contacts or other discrete structures corresponding to thin-film semiconductor devices.

In a fourth preferred embodiment, the cracks resulting from step (c) are filled with a light-reflecting or light-absorbing material.

In a fifth preferred embodiment, a protective layer for physically and chemically protecting the phosphor layer is provided on the surface of the phosphor layer intended for exposure to radiation (on the side opposite to the substrate).

The inventive process has the advantage of forming cracks in a phosphor surface utilizing a cool wall vacuum evaporation technique which permits the use of patterned substrates which are otherwise adversely affected by elevated temperatures.

In this application:

"crack" means an empty space or gap which separates one phosphor cell from another;

"array" means a collection of elements arranged in a predetermined order;

"sensor" means an electronic device for converting electromagnetic radiation into a corresponding electronic signal (e.g., a photodiode or a photoconductor); and "ridge" means a raised or an elevated structure or a recessed structure relative to the surface of a substrate and having an angular inclined slope and an angular declined slope which connect or are coincident at one common region or point, the cross section of a ridge usually resembling a triangle.

Other aspects, advantages, and benefits of the present invention are apparent from the detailed description, examples, figures, and claims.

DETAILED DESCRIPTION OF THE INVENTION

Figure 1:
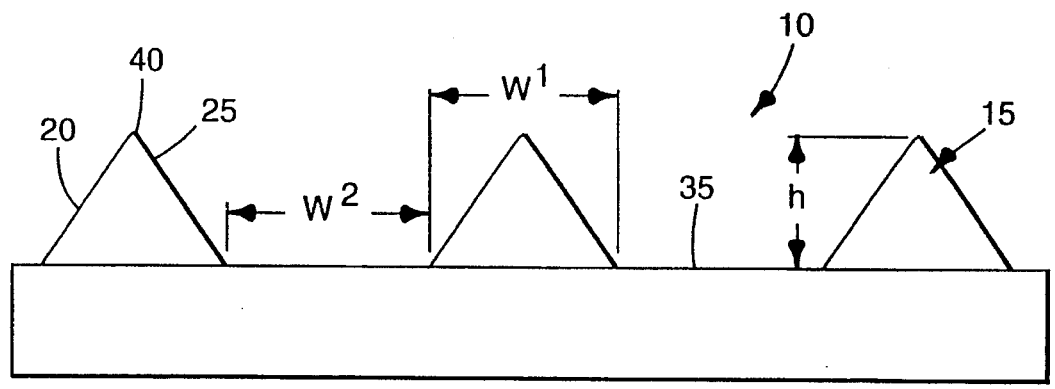
FIG. 1 illustrates a representative pattern of elevated ridges separated by horizontal segments of the surface of a suitable substrate on which a phosphor can be deposited.

Substrate 10 of FIG. 1 can be any material known to those skilled in the art on which an alkali halide phosphor can be deposited.

The support for the phosphor can be various polymeric materials, glass, tempered glass, quartz, metals, and the like. Among them, flexible or easily roll-processable sheet materials are especially suitable in view of the handling of information recording material. From this point of view, the especially preferable material of is, for example, a plastic film such as cellulose acetate, polyvinyl chloride (PVC), plasticized PVC, acrylic, polyester (e.g., polyethylene terephthalate), polyamide, polyimide, cellulose triacetate or polycarbonate film, or metallic sheets such as aluminum, steel, or copper.

The process of forming the phosphor can also be made on a substrate consisting of a sensor array or on a multitude of sensor arrays which can be described as being a "submodule". A collection of sub-modules can be assembled by butting them together in an "edge-to-edge" manner to form a complete, large-size radiographic imaging panel. The process of forming the phosphor can also be made on the large-size radiographic imaging panel. The process of forming the phosphor can also be made dirctly on a sensor array where the metal lines surrounding each pixel area from the patterns for the formation of cracks in the deposited phosphor.

The sensor array can be made of amorphous silicon, single crystal silicon, cadmium telluride, copper indium diselenide, and other sensor materials known to one skilled in the art. In the case of single crystal silicon, the sensor array can be a conventional sensor array on a silicon wafer from about 300 to about 700 microns in thickness. Additionally, the sensor array can be on a thinned silicon wafer, preferably from about 10–50 microns in thickness and more preferably, from about 10–20 microns in thickness. A sensor array on a sufficiently thinned silicon wafer has the advantage of being transparent to light so that the phosphor can illuminate the sensor array through the silicon, from the side opposite to the light-detecting sensor. The use of thinned out wafers, butted edge-to-edge, accomplishes a high fill factor to effectively collect the light from the phosphor. This manner of illumination is termed "back-illumination".

Alternatively, the phosphor can also be made on a fiber optic element. The fiber optic element can be composed of a large bundle of individual optical fibers which are joined parallel to each other so that an image projected into one end of the bundle will be transmitted uniformly to the other end of the bundle maintaining a one-to-one correspondence of the relative positions of different portions of the image. The light transmitting surface of this bundle of fiber optics can be sufficiently smoothed by polishing so as to permit the formation of a patterned surface which can then be coated with uniform deposition of a phosphor.

According to the present invention, a patterned surface is formed on the substrate. With reference to FIG. 1, the patterned surface comprises a plurality of elevated ridges 15 with sloped inclines 20 and declines 25. Each ridge 15 is separated from one another by essentially horizontal segments 35 of substrate 10. The ridge can be elevated from the surface as in FIG. 1 or recessed into the surface as in FIG. 2.

Figure 2:
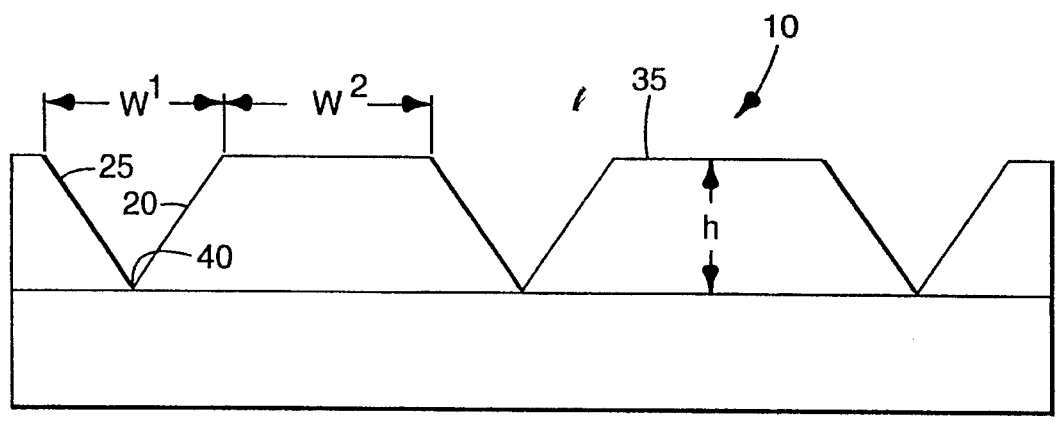
FIG. 2 illustrates a representative pattern of recessed ridges separated by horizontal segments of the surface of a suitable substrate on which a phosphor can be deposited.

With reference to FIGS. 1 and 2, the ratio of the height h of each ridge to the width $w^2$ of each horizontal segment separating the ridge is from about 1:100 to 1:5; preferably, from about 1:30 to 1:10; and more preferably, from about 1:20 to 1:15. The ratio of the width $w^1$ of each ridge to the width $w^2$ of each horizontal segment is from about 1:50 to 1:5; preferably from about 1:25 to 1:10; and more preferably, from about 1:20 to 1:15.

The foregoing predetermined pattern of mesas can be made by any conventional process known to those skilled in the art. Microlithography techniques are typically used, with subsequent chemical etching or physical-chemical etching, or other techniques known to one skilled in the art such as an embossing technique, laser ablation technique, and others. The specific etching method will depend on the type of substrate and the geometry of the pattern desired. The desired patterns can also be obtained, for example, by exposing a glass under ultraviolet radiation with a mask, after which the exposed portion becomes crystallized and will be etched away. One of the representative example materials for this use is Fotoglass™, available from Corning Glass of Corning, New York.

After formation of the predetermined pattern of ridges on the surface of the substrate, an alkali halide phosphor is deposited on the patterned surface. Any alkali halide phosphor can be used in the present invention. Non-limiting examples include cesium iodide (CsI), CsI doped with thallium, CsI doped with sodium, rubidium bromide (RbBr) doped with thallium, RbBr doped with sodium, and sodium chloride doped with copper. Presently preferred are CsI or doped CsI.

The first deposition method is vacuum evaporation. In this process, a vacuum evaporating apparatus into which a support has been placed is evacuated to a level of about $10^{-6}$ Torr. Then, at least one aforementioned alkali halide phosphor is vaporized by resistive heating, electron beam heating, or the like to produce a layer of the phosphor with a desired thickness formed on the surface of the support. The layer containing a phosphor can also be formed by repeating the vaporizing procedures a number of times. In addition, a covacuum evaporation can be conducted using a plurality of resistive heaters or electron beams. It is also possible to heat or cool the deposited layer during vaporization, if necessary, or to heat-treat (anneal) the deposited layer after deposition. In this method, the position of the source relative to the position of the substrate is considered as one of the factors to control the way that the crack formation is accomplished.

After the vacuum evaporating operation, the phosphor-containing layer is optionally provided with a protective layer on its side opposite to the support. Alternatively, it is possible to have the phosphor layer formed on a protective layer first, and then to provide it with a support.

The second deposition method is a sputtering technique. In this process, a sputtering apparatus in which a support has been placed is evacuated to about $10^{-6}$ Torr. Then, an inert gas such as Ar or Ne is introduced into the apparatus to raise the inner pressure up to a level of about $10^{-3}$ Torr. Afterwards, at least one aforementioned alkali halide phosphor is sputtered to have a layer of the phosphor with a desired thickness deposited on the surface of the support. The phosphor layer can also be formed by repeating a plurality of sputtering procedures. It is also possible to heat or cool the deposited layer during sputtering, if necessary, or to anneal the deposited layer after deposition.

After the sputtering operation, the phosphor layer is provided with a protective layer on its side opposite to the support if necessary. Alternatively, it is allowed to have the phosphor layer formed on a protective layer first, and then provide it with a support.

The third deposition method is chemical vapor deposition (CVD). In this method, the phosphor layer is obtained on the support by decomposing the intended phosphor or organometallic compound containing the raw material of the phosphor using thermal energy, high-frequency power, and the like.

The presently preferred method is vacuum evaporation. In this method, the temperature of the substrate during deposition is from ambient temperature to about 300° C., preferably from about 100° C. to about 250° C., and more preferably about 125° C. The boat or crucible which contains the phosphor to be deposited is preferably located at a distance of from about 2 inches to about 10 inches from the substrate, and more preferably about 6 inches from the substrate. The rate of deposition of the phosphor is controlled primarily by the boat or crucible configuration and the power supplied to the heaters, as is well known to those skilled in the art. This deposition rate is controlled to be from about 1 to about 10 microns of phosphor deposited per minute.

The thickness of the phosphor layer is varied according to the radiosensitivity of the intended radiographic image panel, and the type of the phosphor, but is preferably selected from a range from 30 µm to 1000 µm, especially from 80 µm to 500 µm.

When the thickness of the phosphor layer is less than 30 µm, the radiation absorptance thereof deteriorates rapidly, thereby lowering the radiation sensitivity. The graininess of an image obtained therefrom is increased causing a deteriorated image. In addition to the foregoing, the phosphor layer becomes transparent and thus, the two dimensional spreading of excitation rays in the phosphor layer is greatly increased, which results in the tendency wherein image sharpness is deteriorated.

Optionally, in order to further widen the cracks which are formed in the phosphor during deposition, an annealing step can be added immediately after deposition. This annealing can be done in a furnace at a temperature of preferably from about 150° C. to about 300° C., and more preferably at about 250° C., in the presence of nitrogen, preferably for about 1 to about 3 hours, more preferably about 2 hours. A rapid cooling of the phosphor from this annealing temperature is effective in widening the cracks further.

Also, optionally, a thin layer (e.g., 5000 Angstroms) of a suitable highly light-reflective material, such as aluminum or silver, can be deposited in the cracks. A sputtering, evaporation, electroless plating, plating, or other thin film deposition technique can be utilized.

Also, optionally, a black or light-absorbing material can be deposited to minimize light scattering. This manner of coating will confine the light within a definable boundary; however, the total light output from the phosphor may be decreased due to the absorbing of light by the deposited material.

Optionally, a protective layer for physically and chemically protecting the phosphor layer is generally provided on the surface of the phosphor layer intended for exposure (on the side opposite to the support). The protective layer may be provided on the phosphor layer by directly applying thereto a coating dispersion to form the protective layer thereon, or may be provided thereon or by bonding thereto the protective layer formed beforehand. The material of the protective layer may be a conventional material such as nitrocellulose, ethyl cellulose, cellulose acetate, polyester, polyethylene terephthalate, and the like.

The following non-limiting examples further illustrate the present invention.

EXAMPLE 1

A pattern consisting of a plurality of triangular cross sectional ridges 1.6 microns in height and with a base of 2 microns separated from one another by a distance of 100 microns was formed on a #705 glass substrate. The patterned substrate was then mounted in a chamber of an in-house built evaporator. The source was an SO-10 boat (R. D. Mathis, Long Beach, Calif.) loaded with 15 grams of CsI doped with sodium. The system was pumped down to a vacuum of $2 \times 10^{-5}$ Torr. A deposition time of 30 minutes yielded a phosphor thickness of 80 microns in which a series of 2 micron cracks were formed extending from the surface of the phosphor, and centered over the ridge structure, down to the glass substrate.

EXAMPLE 2

The same conditions as used in Example 1 were practiced, with the alteration in the size of the triangular structures being a height of 1 micron, a base width of 15 microns, and a separation of 80 microns. The deposition conditions were the same as in Example 1, and cracks with a width of 2 microns were formed in the deposited phosphor corresponding to the center of the ridge structures.

EXAMPLE 3

The same conditions used in Example 1 were practiced, with the alteration in the size of the triangular structures being a height of 3.3 microns, a base width of 16 microns, and a separation of 80 microns. The deposition conditions were the same as in Example 1, and cracks with a width of 2–3 microns were formed in the deposited phosphor corresponding to the center of the ridge structures.

EXAMPLE 4

Recessed ridges of a triangular cross section were formed in a polyimide substrate of a thickness of 125 microns by embossing. The depth of the ridges was 6 microns, with a base width of 20 microns and a separation of 100 microns. The patterned polyimide was then laminated onto a 3" diameter silicon wafer which was used as a mechanical support. Deposition conditions were the same as in Example 1, and cracks with a width of 2 microns were formed in the deposited phosphor corresponding to the center of the depressed ridge structures.

Reasonable variations and modifications are possible from the foregoing disclosure without departing from either the spirit or scope of the present invention as defined in the claims.

What is claimed is:

1. A process for forming an X-ray radiation detector consisting essentially of the steps of:
   (a) providing a substrate for deposition and growth of an alkali halide phosphor,
   (b) forming a patterned surface on said substrate consisting essentially of a plurality of recessed ridges, each of said recessed ridges having a triangular cross-sectional shape, each recessed ridge being separated from one another by horizontal segments of said substrate and wherein:
      (i) the ratio of the height of each recessed ridge to the width of each horizontal segment of said substrate separating the recessed ridges is in the range of about 1:100 to 1:5;
      (ii) the ratio of the width of each recessed ridge to the width of each horizontal segment of said substrate separating the recessed ridges is in the range of about 1:50 to 1:5; and
   (c) depositing an alkali halide phosphor on the patterned surface of the substrate of step (b) having said recessed ridges, thereby forming cracks positioned over each of said recessed ridges.

2. The process according to claim 1 wherein said substrate is glass, single crystal silicon, aluminum, nickel, copper, or plastic.

3. The process according to claim 1 wherein said substrate has a coefficient of thermal expansion from 10 to 100 times smaller than the coefficient of thermal expansion of the phosphor.

4. The process according to claim 1 wherein said ratio in (b)(i) is about 1:30 to 1:10.

5. The process according to claim 1 wherein said ratio in (b)(i) is about 1:20 to 1:15.

6. The process according to claim 1 wherein said ratio in (b)(ii) is about 1:25 to 1:10.

7. The process according to claim 1 wherein said ratio in (b)(ii) is about 1:20 to 1:15.

8. The process according to claim 1 wherein the substrate has a thickness ranging from 100 to 400 microns.

9. The process according to claim 1 wherein said alkali halide phosphor is deposited by vacuum evaporation.

10. The process according to claim 1 wherein said alkali halide phosphor is CsI or doped CsI.

11. The process according to claim 1 wherein said alkali halide phosphor is doped rubidium bromide.

12. The process according to claim 1 wherein said alkali halide phosphor is copper-dopped sodium chloride.

13. The process according to claim 1 wherein a light-reflective or light-absorbing material is deposited into said cracks.

14. The process according to claim 13 wherein said light-reflecting material is aluminum.

15. The process according to claim 13 wherein said light-reflecting material is silver.

16. The process according to claim 1 wherein a protective layer is deposited over said phosphor.

17. The process according to claim 1 wherein an array of sensors is disposed on said substrate in (a).

18. The process according to claim 17 wherein said array of sensors is composed of single crystal silicon.

19. The process according to claim 18 wherein said array of sensors are formed on back-illuminated thinned-out silicon.

20. The process according to claim 1 wherein a fiber optic element is disposed on said substrate in (a).

21. The process according to claim 1 wherein said substrate in (a) has a multiplicity of sensor sub-modules butted together in an edge-to-edge manner.

22. The process according to claim 1 wherein said patterned surface includes metal electrodes and semiconductors.

23. The process according to claim 1 wherein a silver halide-based photographic film is disposed on said substrate in (a).

24. The process according to claim 1 further comprising the step of annealing the cracked phosphor structure resulting from step (c) in an inert atmosphere at a temperature of from about 150° to 300° C. for about 1–3 hours.

* * * * *